June 24, 1941.  A. L. CHRISTIANSEN  2,246,839
MEANS FOR CUTTING FISH
Original Filed April 1, 1935

Inventor
ANDREW L. CHRISTIANSEN

Patented June 24, 1941

2,246,839

UNITED STATES PATENT OFFICE 2,246,839

MEANS FOR CUTTING FISH

Andrew L. Christiansen, Willowbrook, Calif.

Original application April 1, 1935, Serial No. 14,052. Divided and this application December 6, 1937, Serial No. 178,201

4 Claims. (Cl. 17—4)

My invention relates to fish machines and particularly to a machine or device for cutting or splitting the belly walls of fish.

One of the principal objects of this invention is to provide a device of this class whereby a knife is so drawn over the belly walls of fish that substantially only the thin belly wall is cut or split and whereby the entrails remain whole, and further to provide such a device which will perform this function on fish of considerably different sizes.

Another object of this invention is to provide a very simple and economical device for performing the above function.

Figure 1:
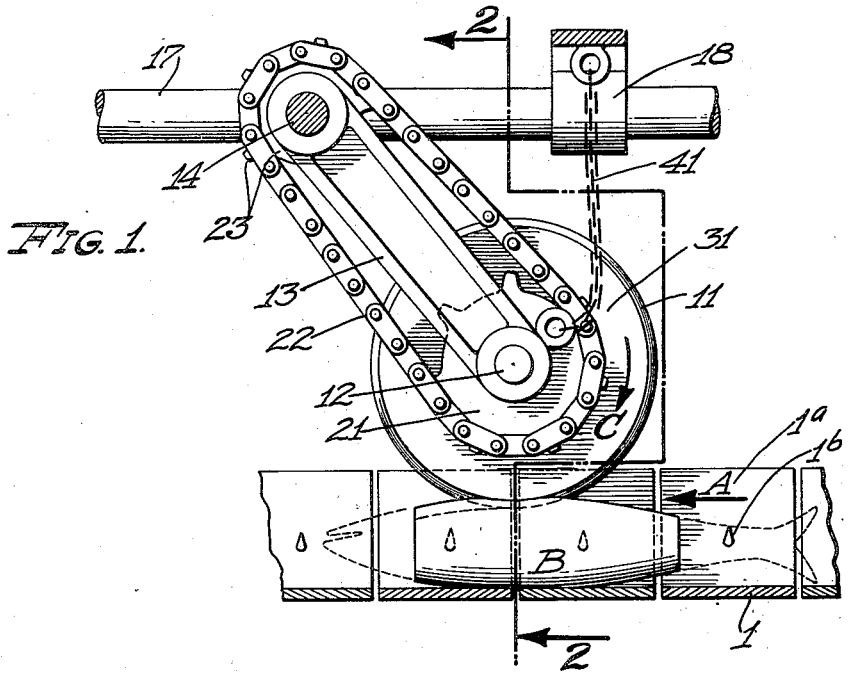
Figure 2:
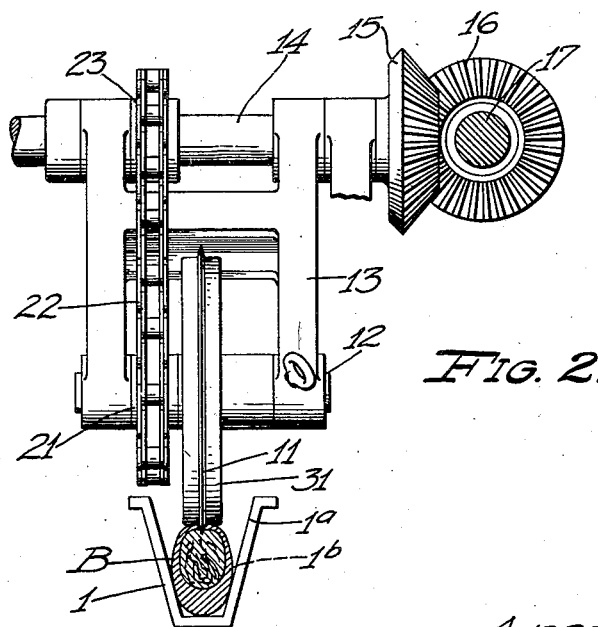

With these and other objects in view, as will appear hereinafter, I have devised a novel construction, combination and arrangement of elements as will be hereinafter described in detail and particularly set forth in the appended claims, reference being had to the accompanying drawing and to the characters of reference thereon, which form a part of this application, in which:

Fig. 1 is a fragmentary side elevational view of an embodiment of my fish belly-splitting machine in a preferred form; and Fig. 2 is a sectional end elevation thereof, taken on the line 2—2 of Fig. 1.

This is a divisional application of my copending application for Fish cutting machines, Serial No. 14,052, filed April 1, 1935, now Patent Number 2,166,939, dated July 25, 1939. Only the parts and portions necessary to the understanding of this invention will be here referred to, the other and cooperating portions of the whole machine are illustrated and described in the aforementioned application.

The conveyor 1, consisting of V-shaped links 1ª, provides a V-shaped channel moving longitudinally in the direction of the arrow A. This conveyor carries in its channel fish on their backs, that is, with their bellies uppermost, as indicated by B. These fish may be of various sizes, and either whole or sectional, that is, the entrail sections with the head and tail ends removed. Longitudinal movement of the fish or sections thereof within the channel of the conveyor is substantially prevented by barbs or prongs 1ᵇ extending into the channel from the inclined walls forming the channel.

My cutter, for splitting the belly walls of the fish, consists of a circular cutter or knife 11, mounted on and rotatable with a spindle 12. This spindle is rotatably mounted at the free end of an H-shaped frame 13 which is pivotally supported at its other end on a shaft 14. This shaft may be driven in any suitable manner, such as, through gears 15 and 16 from a common drive shaft 17 supported on a frame 18. The spindle 12 has a sprocket 21 which is driven by a chain 22 from a sprocket 23 mounted on and driven by the shaft 14.

At the opposite sides of the circular or disc cutter 11 are positioned shoulder discs 31 which are secured against and rotated with the cutter. The faces of the disc 31 are relatively wide and are spaced backwardly or inwardly from the cutting edge of the cutter 11 a distance substantially that of the belly wall of the fish to be split. The faces of the discs 31 provide shoulders which ride or rest upon the fish and thus limit the depth of the cut, or make a uniform depth incision from end to end of the fish, or section thereof.

The frame 13 extends downwardly at an angle in the direction of the approaching fish in the conveyor 1. The downward position is limited by an adjustable stop chain 41 which connects the free end of the H-frame to the machine frame 18.

As the fish approach the cutter 11, in the direction of the arrow A, the shoulder discs 31, which are rotated in the direction of the arrow C, crawl and ride upon the fish, thereby raising the H-frame 13 as required, and allowing the cutter 11 to make a longitudinal incision in or to cut through the belly wall of the fish. The cutter may then drop downwardly until it is again raised by the next fish.

By reason of the particular downward inclination of the pivoted frame 13 and the particular rotation of the cutter 11 and shoulder discs 31, the latter are easily raised, and at the same time the fish are held in the channel of the conveyor and are assisted in their progressive movement.

Though I have shown and described a particular construction, combination, and arrangement of parts and portions of the aparatus of my invention, I do not wish to be limited to the same, but desire to include in the scope of my invention the construction, combination, and arrangement substantially as set forth in the appended claims.

I claim:

1. In a machine of the class described, a conveyor having a longitudinal channel open at its top adapted to receive and convey fish on their backs, and a vertically shiftable cutter extending into said channel for splitting the bellies of fish therein, said cutter having a wide shoulder spaced backwardly from the cutting edge of the cutter a distance substantially equal to the thickness of the belly walls to be split, and so positioned as to ride directly upon the fish and limit the cut through the belly walls, said cutter being mounted sufficiently sensitive so as to be raised and lowered by the fish advanced by the conveyor.

2. In a machine of the class described, means for conveying fish on their backs, a cutter supporting frame pivotally mounted at one end above the conveying means and depending from the pivotal axis at a slight angle toward the approaching conveying means, means for limiting the low position of the frame, a cutter rotatably mounted on the free end of the frame with the plane of the cutter in line with the conveying means and adapted to extend into the latter, the cutter having a shoulder spaced backwardly from the cutting edge of the cutter a distance substantially equal to the thickness of the belly walls to be split, said shoulder being adapted to ride directly upon the approaching fish for limiting the depth of cut of the cutter into the belly walls of the fish, said cutter being mounted sufficiently sensitive so as to be raised and lowered by the fish advanced by the conveyor.

3. In a machine of the class described, movable means for conveying fish on their backs, a cutter support shiftable vertically with respect to the conveying means and a cutter rotatably mounted on the support adjacent the conveying means, said cutter having a wide shoulder spaced backwardly from the cutting edge of the cutter a distance substantially equal to the thickness of the belly walls to be split, said shoulder being so positioned as to ride directly upon the fish and limit the cut through the belly walls, said support being mounted sufficiently sensitive so as to be raised and lowered by the fish advanced by the conveyor, the edge of the cutter and the surface of the shoulder being movable in the direction of movement of the conveying means.

4. In a machine of the class described, a conveyor having a continuous longitudinal channel open at its top, adapted to receive and convey fish on their backs, a cutter support shiftable vertically with respect to the conveyor, and a cutter rotatively mounted on the support adjacent the conveyor, said cutter having a wide shoulder spaced backwardly from the cutting edge of the cutter a distance substantially equal to the thickness of the belly walls to be split, said shoulder being so positioned as to ride directly upon the fish and limit the cut through the belly walls, said support being mounted sufficiently sensitive so as to be raised and lowered by the fish advanced by the conveyor, the edge of the cutter and the surface of the shoulder being movable in the direction of movement of the conveyor.

ANDREW L. CHRISTIANSEN.